Aug. 16, 1966  R. B. BROOKS ET AL  3,266,670

LIQUID DRINK DISPENSING MACHINE

Filed May 13, 1964

INVENTORS
GILBERT TOTTEN,
ROBERT B. BROOKS
BY
Schroeder & Siegfried
ATTORNEYS

United States Patent Office 3,266,670
Patented August 16, 1966

3,266,670
LIQUID DRINK DISPENSING MACHINE
Robert B. Brooks, Golden Valley, and Gilbert Totten, Minneapolis, Minn., assignors to Advance Engineering Company, Minneapolis, Minn., a corporation of Minnesota
Filed May 13, 1964, Ser. No. 367,033
5 Claims. (Cl. 222—54)

Our invention relates to liquid drink dispensing machines and more particularly to an improved liquid drink dispensing machine particularly adapted for use in dispensing of heated liquids with a simplified valving and control system for the same.

Hot and cold liquid drink dispensing machinery is well recognized and in use. Most of these prior devices are complex in their liquid control circuits and valving as well as in their electrical control circuits. The improved liquid drink dispensing machine of the present invention utilizes an open type fluid circuit with a single valve controlling the flow of the liquid to the container in which the drink is to be dispensed. In this improved liquid drink dispensing machine, provision is made for heating the liquid for hot beverages and the open fluid system includes provisions for taking care of the expansion of the liquid in the heated liquid tank. The improved liquid dispensing machine also includes provision for washing the mixing apparatus of the dispensing machine without additional valving or control timing.

It is therefore an object of this invention to provide an improved liquid drink dispensing machine.

Another object of this invention is to provide in a liquid drink dispensing machine a simplified fluid control circuit of the open circuit type utilizing simplified valving to control the water supply to the heating tank and the mixing chamber of the drink dispensing machine.

A further object of this invention is to provide in a liquid drink dispensing machine an improved means for taking care of expansion water in the heating tank.

Another object of this invention is to provide in a liquid drink dispensing machine a simplified means for providing the water supply to clean out the mixing chamber.

These and other objects of this invention will become apparent from a reading of the attached description together with the drawings wherein.

Figure 1:
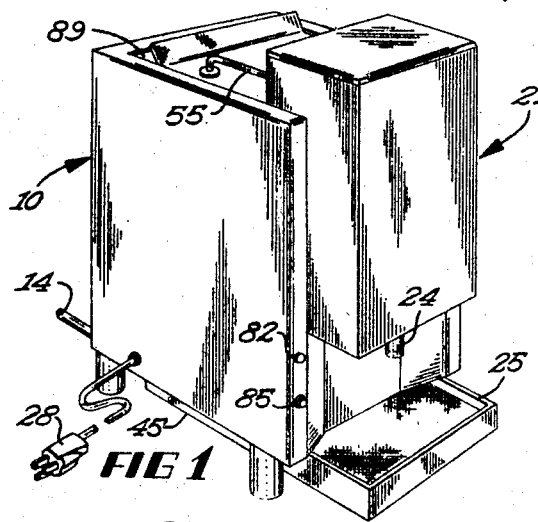
FIGURE 1 is a perspective view of the improved liquid drink dispensing machine.
Figure 3:
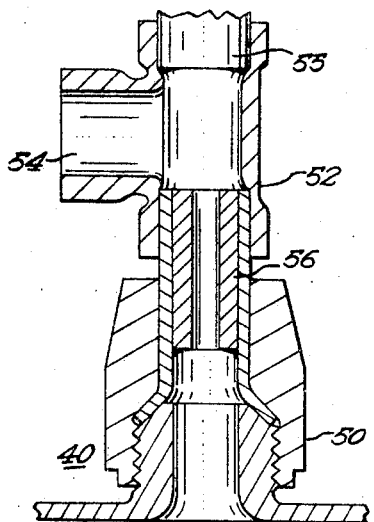
FIGURE 3 is a sectional view of the vented connection for the improved liquid drink dispensing machine.

Our improved drink dispensing machine is shown in FIGURE 1 as including a casing indicated generally at 10. This improved machine includes basically a tank 12 which is adapted to be connected to a source of water indicated by pipe 14. Water from the tank is fed to a mixing chamber indicated generally at 20 into which is introduced a flavoring material from a dispensing section, indicated generally at 22, with the mixture of flavoring material and water being dispensed at the outlet 24 of the mixing chamber to the receptacle holding portion 25 of the machine at which containers, such as cups, are filled. This improved liquid dispensing machine is shown and described herein as a hot beverage dispenser, preferably of the hot chocolate or cocoa type, and as will be later noted, the tank 12 includes a suitable heating means for heating the water and the liquid dispenser dispenses a chocolate flavoring material which is mixed in the mixing section by an agitator, to be later defined, to mix the flavoring and tempered water and provide a chocolate drink at the outlet 24 into a receptacle, such as a cup. In addition to the inlet water supply pipe 14, the casing has connected thereto an electrical cord and plug, indicated at 28, which is adapted to be connected to a source of electric power. This improved liquid dispensing machine is of the open circuit or system type and utilizes a single valve in the water line, as will be later identified. While we have shown and disclosed the dispensing machine as applicable to hot drinks, it will be recognized that the water tank may have a heat exchanger of the cooling type associated therewith and most of the features of the machine will be applicable thereto.

Figure 2:
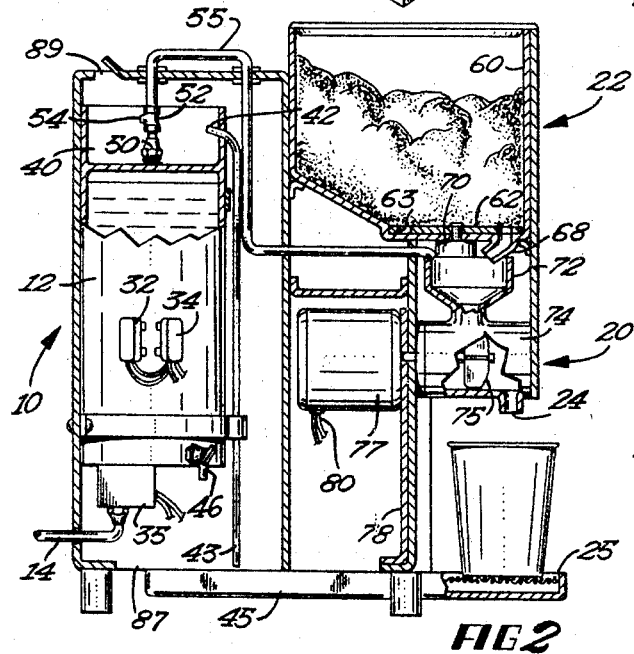
FIGURE 2 is a sectional view of the liquid drink dispensing machine taken along the lines 2—2 of FIGURE 1.
Figure 4:
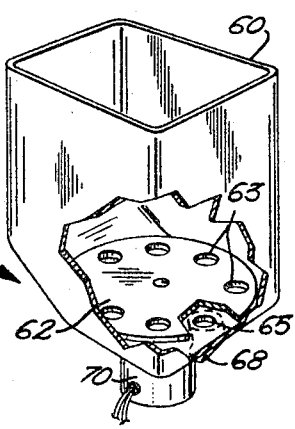
FIGURE 4 is a sectional view of the flavor dispensing chamber of the liquid drink dispensing machine.

As will be seen in FIGURE 2, the tank 12 has a heater or heat exchanger (not shown) included at the inner surface thereof which is connected through electrical terminals 32 to a thermostat type control 34 which in turn is adapted to be continuously connected to a source of power whenever the line cord 28 is connected to an outlet electrical source. At the inlet to the tank and within the casing 10 is positioned a valve 35 of the solenoid type providing on-off type operation and controllably energized by the electric circuit to be hereinafter identified. This valve controls the flow from the water supply, normally cold, into the tank at predetermined intervals, as will be hereinafter identified. Extending from the top of the tank is a circular flange section 40 which provides a reservoir for overflow water, which, as will be hereinafter described, is adapted to be evaporated by the heat of the tank. In the event that this water in the level reaches a predetermined height, the overflow pipe 42 is provided leading through a conduit 43 to a pan 45 or suitable container associated with a casing located in the base of the casing 10. The inlet valve 35 is shown in block form since it is conventional and may take varying forms. Also included in the tank is a drain cock 46 at the lower edge thereof designed for draining the tank for maintenance purposes. Thermostat 34 is shown in block inasmuch as it might take varying forms and merely provides for connection of the heaters to the electrical source in accordance with the water temperature conditions within the tank 12.

Positioned at the top of the tank 35 is an outlet connection, indicated at 50, which outlet connection includes the T-shaped coupling member 52 having the trunk of the T open as a vent pipe, such as indicated at 54. The coupling connects to a tubing 55 extending over a portion of the chassis in a general U-shaped configuration and down to the mixing chamber 20, as will be hereinafter identified. The T-shaped coupling includes a restriction 56 positioned at the inlet side of the same which restriction has an internal dimension or cross section appreciably reduced from the cross sectional area of the remaining portion of the coupling including the vent section 54. These areas bear the ratio of approximately 9 to 25. As will be hereinafter noted, water under pressure from the tank which is established by the line pressure from the water source or pipe 14 will be of sufficient pressure and the spacing of the restriction from the vent opening or pipe 54 is such that water will be directed beyond the restriction under normal line pressure and beyond the vent opening to the tubular connected portion 55 of the open system. The normal water pressure required for this type of flow will be in the neighborhood of 18 inches or more, of water head. With this arrangement, the vent will always be open to the atmosphere and will be positioned above the reservoir portion of the tank as defined by the flange section 40 so that under normal operating conditions when water is flowing through the tank and tubing 55, no water will be directed from the vent opening 54 since the water flow due to the converging action of the restriction on the same will be directed beyond this opening. This open water system permits a single valve at the inlet side of the tank which single valve provides for the flow of water from the source into the tank, a flow of water from the tank through the coupling 52 or vented connection and beyond the same through the tubing to the mixing chamber with the dispensing machine. No valving is required at the outlet side of the same, but the vent opening is always open to atmosphere such that it will be available to equalize the pressure on the tubing and, as will be hereinafter noted, allow for draining of the water in the tubing 55 by breaking the vacuum therein.

Under closed conditions of operation of the valve, and with the heater in the tank operated continuously, the water in the tank which is kept filled will expand upon heating and the excess water will flow to the vent opening where it will drain into the reservoir to be exposed to the tank in a heat conducting relationship therewith and evaporate. This will take care of the expansion water from the tank and will prevent any water from being moved through the tubing 55 to the outlet portion of the dispensing machine. It will be noted in the drawing, that the outlet tube is U-shaped in form and directed above the tank such that all expansion water will be allowed to flow out the vent opening and not down the tubing under the valve closed conditions.

Positioned in front of the tank 12 in the casing 10 is the dispensing chamber 22 of the liquid dispensing machine. This chamber includes a housing 60 for the flavoring material, normally in dried or powder form, which is to be dispensed into the mixing chamber and mixed with the tempered water to provide the drink. The dispensing chamber includes a circular disk 62 having a plurality of apertures 63 therein which disk is driven by a motor indicated generally at 70. The chamber 60 has a hole or aperture 65 therein and a chute 68 below the same which is adapted to be aligned with the hole 63 in the plate 60 as the motor is operated to allow material or flavoring in the chamber 60 to drop through the chute and into the mixing chamber 20.

The mixing chamber is shown generally at 20 as including an upper cup portion 72 into which the dispensed flavoring material and water are introduced. This cup portion has an aperture therein connected to a cylindrical portion 74 of the mixing chamber at the base of which the outlet pipe 24 is located. Pipe 24 extends into the receptacle section 25 of the dispensing machine where the cup or container is positioned into which the liquid drink in mixed form is dispensed. A whipper blade 75 is located in the cylindrical portion 74 of the mixing chamber 20 which whipper blade is connected to and driven by a whipper motor 77. Motor 77 is attached to a flange section 78 of the casing. Outlet connections 80 for the whipper motor connect to the electrical circuit, as will be hereinafter identified. Positioned adjacent the receptacle portion of the casing is an indicator light 82 which indicates when the whipper motor 77 is energized, the dispenser motor 70 is operating and the water valve 35 is open. Also included on the side of the casing is a control switch 85 adapted to be manually initiated and having a given time delay on drop out, which switch controls the energization of the solenoid valve 35, the dispensing motor 70 and the whipper motor 77 which rotates the blades 75 in the chamber 74. This circuit also includes the control circuit for the indicating light 82.

Figure 5:
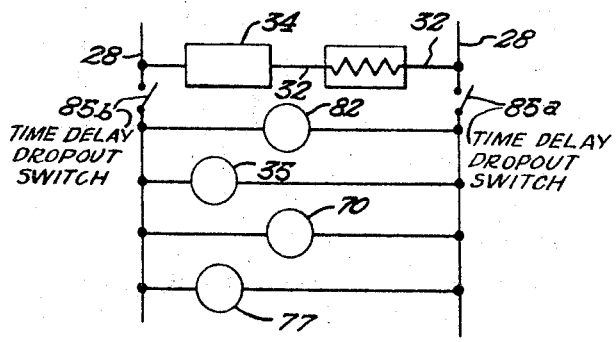
FIGURE 5 is a schematic electrical circuit diagram for the liquid drink dispensing machine.

As will be seen in FIGURE 5, the schematic circuit shows the contacts of the switch 85 indicated at 85a and 85b which connect the source of power indicated by the conductors 28 to these motor units. It will be noted that the heater section 32 is controlled through thermostate 34 ahead of the switch contacts 85a and 85b so as not to be controlled thereby but rather to provide continuous energization of the heater in accordance with the control of the thermostat. Closure of the switch contacts 85a and 85b will connect the supply conductors 28 beyond the switch to the solenoid valve 35, the dispenser motor 70 and the whipper motor 77 which will all be energized and remain operating as long as the contacts 85a and 85b are closed. This is a schematic circuit in simplified form to indicate that the time delay or timing of the switch 85 will control the energization of the valve, the dispensing motor and the operation of the motor 77 for the whipping chamber for a predetermined period in each drink dispensing operation. Similarly, the light 82 will be energized and indicating operation of these control components for the drink dispensing machine during this period.

In the operation of the improved liquid drink dispensing machine, the open water circuit or system will be initiated by an opening of the solenoid valve 35 allowing water to be directed in the source 14 into the tank 12 displacing hot water from the upper area of the tank through the coupling 52 and the tubing 55 into the mixing chamber 20. Simultaneously, the dispensing motor 72 will rotate into a position where one of the holes 63 will be aligned with the hole 65 and chute 68 to dispense a given amount of flavored material into the cup portion 72 of the mixing chamber 20. During this period of time and simultaneously therewith, the whipper motor 77 will be energized and the blade 75 in the chamber 74 will be rotating to mix the flavored material with the hot water, and allow the same to drain from the outlet 28 of the mixing chamber into the receptacle portion 25 and the container therein. The water pressure, the size of the restriction and the relative size of the tubing are such that water directed through the restriction 56 will be directed past the open vent pipe 544 and through the tubing 55 into the mixing chamber. Therefore, no water will be allowed to flow through the vent pipe 54 under these conditions and as such the vent pipe and relationship of the restriction thereto acts as a check valve for flow in this direction. After the timing sequence of the switch 85, the contacts 85a and 85b will open de-energizing the solenoid valve 35, the dispensing motor 70 and the whipper motor 77. During this period of time the dispensing section 22 of the dispensing machine will allow the plate 62 to have moved past the opening 65 with one of the openings 63 and will come to rest at an intermediate point in which an opening 63 is not aligned with the opening 65 and the chute 68 of the dispensing portion of the machine. This apparatus is disclosed in an earlier application assigned to the present assignee and its details form no part of the present invention since suitable or similar dispensing equipment may be utilized for this purpose. The mixture of flavoring and water draining from the outlet 24 of the mixing chamber 20 will fill the cup or container partially and after the valve 35 is closed, the momentum of fluid coming from the tank 12 will carry the remaining fluid in the tubing 55 down to the mixing chamber 20 where this remaining fluid will rinse the cup portion 72 and the cylindrical portion 74 of the mixing chamber together with the blade 75 of the whipper motor allowing the rinse water to drain into and join the portion of the drink already in the container. The open vent 54 in the T-shaped coupling member or tubing 52 insures that no vacuum will exist in this line and the equalization of pressure will allow the line to drain completely providing for wash water, as well as additional fluid, to be added to the drink dispensed. In this manner, no special valving is required after the operation of the original or primary controlling valve 35, thereby simplifying the dispensing machine.

The vent pipe 54 connection positioned at the top of the tank 12 allows for rise or expansion of water when the valve 35 is closed and upon heating of the water in the tank so that the water may drain into the reservoir section 40 to be exposed to the heated upper surface of the tank. This heat will tend to evaporate the water and in addition, the heated surface of the tank together with the open section 87 in the base of the casing and in opening 89 at the top of the casing will permit air to flow by convection to further carry away the moisture from the water positioned in the reservoir 40 due to expansion of the fluid in the tank. This will prevent any dripping of water at the receptacle portion 25 of the machine which is also disposed over the tray 45 in the base of the casing 10 which serves to collect and store the waste water and spilled drink material which is cleaned out during maintenance operations. The overflow pipe 42 in the reservoir 40 insures that the water will not stand at too great a level in the reservoir but will rather be drained into the collecting tray 45 in the base of the casing in the event that too much expansion of water is directed through the vent pipe 54 which could not safely be evaporated.

This simplified water system and control system in an improved liquid dispensing machine requires only a single valve controlling the water flow through the heating tank and to the dispensing portion of the apparatus together with a single motor for operating the dispensing portion of the machine. The whipper motor is utilized in the case of vending of hot chocolate where it is required that some agitation be present to thoroughly mix the water with the flavor material. In other types of drink dispensing machines, this portion of the apparatus may be omitted. The simple timing switch and control circuit simplifies the overall control dispensing machine and the addition of the vented connection at the portion of the tank permits the passage of drain water from the tubing for the afterwash of the apparatus to maintain the desired sanitary conditions. This vented connection also takes care of overflow water due to expansion when heated fluid is used in the drink dispensing machine and the reservoir positioned on top of the tank and in heat conducting relation therewith insures evaporation of this fluid.

In considering this invention, it should be remembered that the present disclosure is intended to be illustrative only and the scope of the invention should be determined by the appended claims.

We claim:

1. In a liquid drink dispensing machine comprising, a base, a tank mounted on said base and having an inlet pipe adapted to have a source of water under pressure connected thereto, said tank including a reservoir associated in heat transmitting relation therewith, heat exchanger means positioned in the tank and adapted to continuously temper the water therein, said heat exchanger means being an electrical heating element positioned in the tank and including connections to an electrical source of power and thermostatic means for responding to the temperature of the water in the tank to maintain said water at a predetermined temperature level, valve means positioned at the inlet pipe to said tank and adapted to control the flow of water from said tank, an outlet pipe having a vented opening therein and a tubing extending therefrom connected to the outlet of said tank at the top thereof, a mixing chamber, the tubing from the outlet pipe of the tank being directed into said mixing chamber, a dispensing chamber for a flavoring material positioned above said mixing chamber, means controlling the dispensing of a fixed amount of said flavoring material from said dispensing chamber into said mixing chamber simultaneously with a supply of tempered water thereto, a motor driven agitator positioned in said mixing chamber and operated simultaneously with the supply of tempered water from said tank and delivery of the dispensed flavoring material from said dispensing chamber to said mixing chamber, a discharge pipe attached to the mixing chamber adapted to transmit a solution of flavored tempered water to a remote container, circuit means connected to and energizing the valve means at the inlet of said tank and the motor driven agitator together with the means for controlling the dispensing of flavored material for simultaneous operation, the vented opening in said outlet pipe including a restriction in the outlet pipe from said tank and a transverse passage positioned adjacent said restriction and downstream of the same such that flow of water in the outlet pipe from said tank under pressure will be directed through said restriction and beyond said transverse passage open to the atmosphere to the tubing and the mixing chamber, said vented opening permitting drainage of water in the tubing after closing of the valve means at the inlet pipe to said tank to clean the mixing chamber and the agitator therein and allowing the expanded fluid in the tank through heating therein to pass through the transverse passage and into the reservoir to be evaporated by heat from the tank, an overflow pipe positioned in said reservoir at a predetermined height therein with a tubing to the base of the dispensing machine, and a collecting tray positioned at the base of said dispensing machine and in communication with the tubing connected to the overflow pipe to take overflow water from the reservoir not evaporated by the heat of said tank.

2. A liquid drink dispensing machine comprising, a tank having an inlet pipe adapted to have a source of water under pressure connected thereto at the bottom of the tank, heat exchanger means positioned in said tank and adapted to continuously temper the water therein, reservoir means positioned on the top of the tank, valve means positioned in the inlet pipe to said tank and adapted to control the flow of water from the source of said tank, a single outlet pipe means positioned in the top of the tank and within the reservoir, said outlet pipe means included a vented opening positioned over the reservoir and a tubing connected thereto, a mixing chamber, the tubing from the outlet pipe means being connected to the mixing chamber, a dispensing chamber for flavoring material positioned above the mixing chamber, means controlling the dispensing of a fixed amount of flavoring material from said dispensing chamber into the mixing chamber simultaneously with the supply of tempered water thereto, a motor driven agitator positioned in the mixing chamber and operated simultaneously with the supply of water from the tank and delivery of dispensed flavoring material from the dispensing chamber to the mixing chamber, discharge pipe means attached to the mixing chamber and adapted to transmit the solution of flavored tempered water to a remote container, said reservoir being open at one side thereof and the said vented opening in the outlet pipe being so positioned above said reservoir as to be continuously vented at atmosphere, and a restriction located in the outlet pipe adjacent the opening and ahead of the same so that water from the tank flows through the restriction and past the opening to be directed through the tubing to the mixing chamber whenever the valve means in the inlet pipe to the tank is open, the vented opening in the single outlet pipe means permitting drainage of water in the tubing to the mixing chamber after closing of the valve means in the inlet pipe to the tank to clean the mixing chamber and the agitator therein and permitting water from the tank upon expansion of the same through heating of the tank to pass into the reservoir to be evaporated by heat of the tank.

3. The liquid drink dispensing machine of claim 2 and including means in the reservoir to limit the height of the water therein below the vented opening in the outlet pipe so that the vented opening is continuously vented to atmosphere.

4. The liquid drink dispensing machine of claim 3 in which the vented opening in the outlet pipe includes a T shaped pipe coupling attached to the outlet pipe at the tank with the restriction therein positioned between the tank and the vented opening with a transverse portion extending over the reservoir above the tank containing the vented opening and positioned to be continuously above the height of water in the reservoir.

5. The liquid drink dispensing machine of claim 4 and including an overflow pipe positioned in the reservoir at the top of the tank and extending to the base of the tank being located at a predetermined height therein to limit the height of water in the reservoir below the vented opening in the outlet pipe means.

References Cited by the Examiner
UNITED STATES PATENTS

| | | | |
|---|---|---|---|
| 2,682,976 | 7/1954 | Melikian et al. | 222—129.3 X |
| 3,007,609 | 11/1961 | Pascucci | 222—146 X |
| 3,086,682 | 4/1963 | Martin | 222—146 |
| 3,159,190 | 12/1964 | Skiera et al. | 222—146 X |

RAPHEL M. LUPO, *Primary Examiner.*

ROBERT B. REEVES, LOUIS J. DEMBO, *Examiners.*

F. R. HANDREN, *Assistant Examiner.*